Patented Feb. 7, 1939

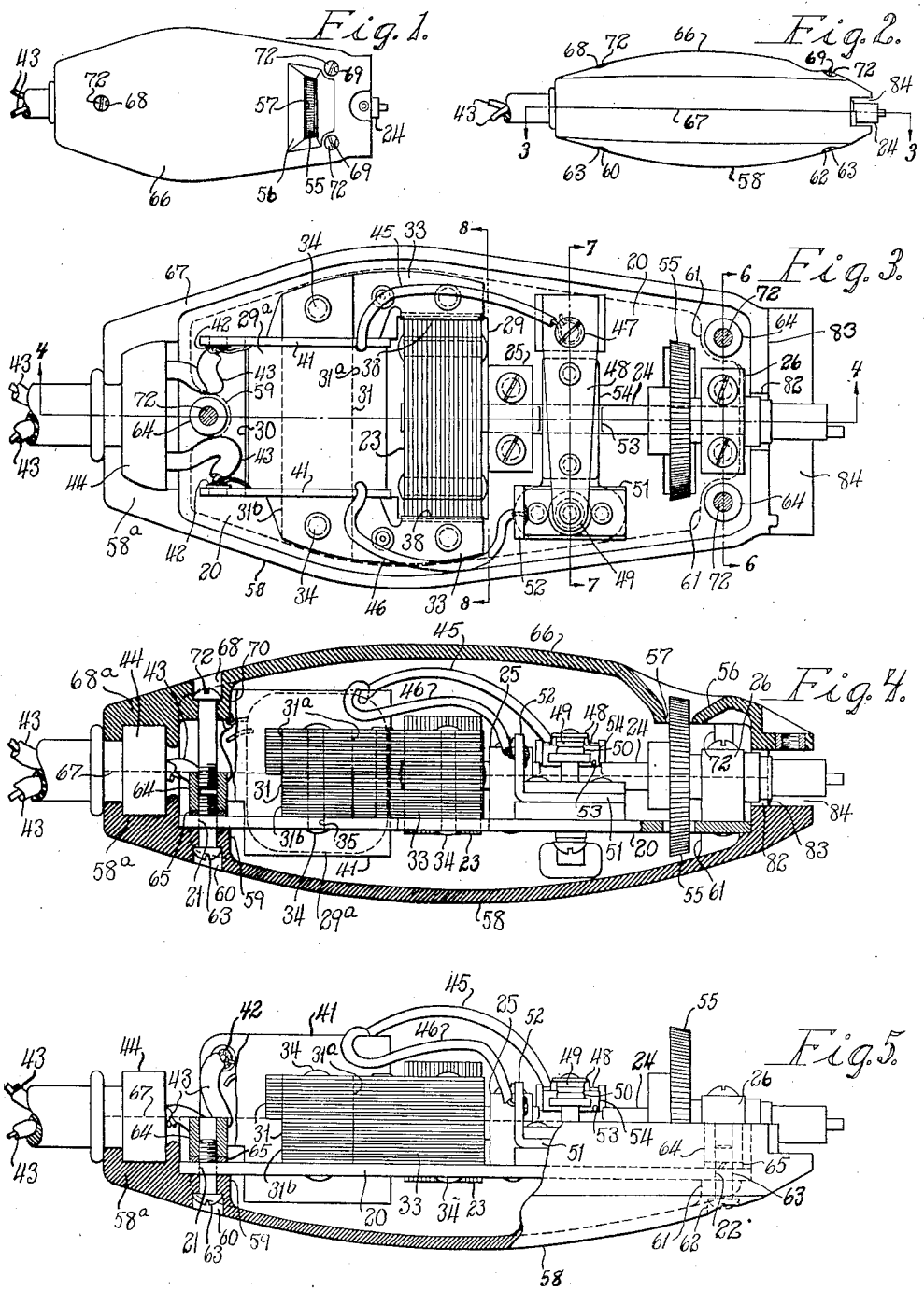

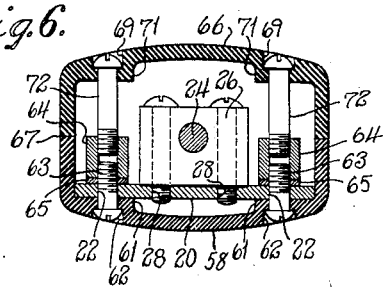
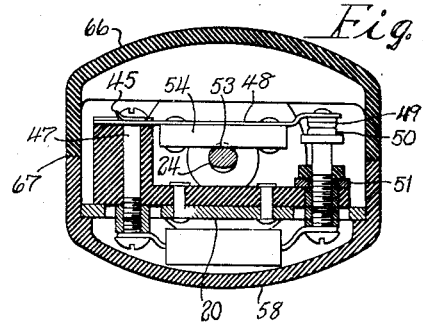
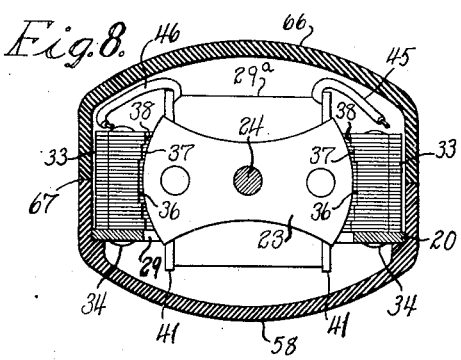
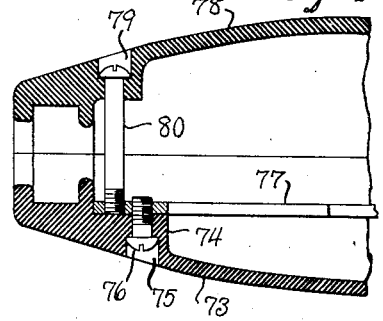
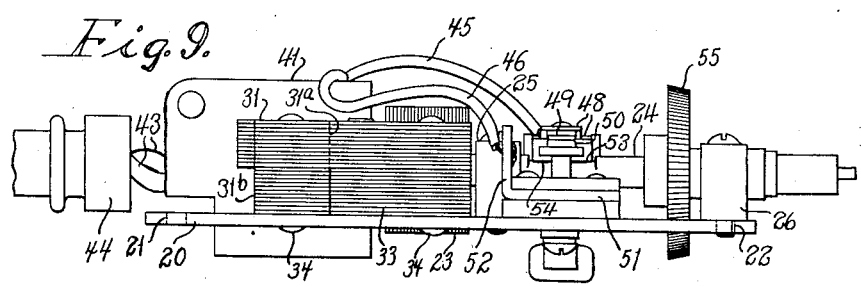
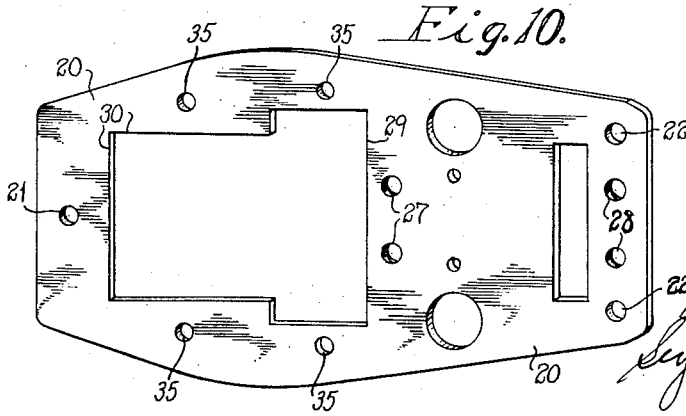

2,146,551

UNITED STATES PATENT OFFICE 2,146,551

POWER-DRIVEN HAND TOOL

James R. Putnam, Prospect, Conn., assignor to The Waterbury Clock Company, Waterbury, Conn., a corporation of Connecticut Application March 22, 1938, Serial No. 197,382

15 Claims. (Cl. 172—36)

The present invention relates to an improvement in power-driven hand tools and has for its general object to provide an improved construction, combination, and arrangement of parts to enable devices of this character to be built up as a complete structural unit independently of and prior to its placement in a hand-grip casing.

One of the objects of this invention is to provide an improved balanced arrangement and coordination of parts in the motor-assembly of a power-driven hand tool for the purpose of reducing vibration and noise produced by the operation of the hand tool.

A further object of the invention is to provide an improved construction and arrangement of parts in a power-driven hand tool to include a power-converting and power-transmitting unit which is structurally and functionally complete in itself, irrespective of the hand-grip casing in which it is encased; to facilitate the construction and assembling of the component parts and thus to lower the cost of manufacture for quantity production; to provide an improved unitary mount for the stator structure and rotating system of a motor-assembly for power-driven hand tools; and to facilitate inspection, repair or replacement of parts in the motor-assembly.

Another object of the invention is to provide means of simple and effective construction whereby the component parts of a power-converting and power-transmitting unit of a power-driven hand tool, may be set up independently of and prior to its installation in a hand-grip casing for the purpose of facilitating the handling and more accurate arrangement of the several parts. Toward the attainment of this object, the invention contemplates an improved assembly of the working parts of the power-driven hand tool on an assembly-frame or plate whereon said parts are permanently mounted prior to the installation of the assembly-plate and parts within a hand-grip casing.

Another object of the invention is to provide a laminated electromagnetic stator of improved construction; an improved arrangement of the component laminae in the pole-arms of said stator in stepped formation about the peripheral path of the motor-armature in such a way as to render it unnecessary to perform a relatively-expensive machining operation on the pole-arms after they have been assembled in permanent form.

A specific object of invention is to provide simple and effective means of improved construction to arrange the parts of a hand-grip casing in accurately-registered relation each to the other and in accurately-predetermined relation to the hand-tool assembly whereby a more effective organization of all of these parts is effected.

With the above and other objects in view, as will appear to those skilled in the art, from the present disclosure, this invention includes all features in the said disclosure which are novel over the prior art.

In the accompanying drawings which show a preferred form of the invention:

Fig. 1 is a top plan view of a dry shaver embodying the present invention;

Fig. 2 is a side elevation of Fig. 1;

Fig. 3 is an enlarged horizontal section on the line 3—3 of Fig. 2, the motor-assembly being shown in top plan view;

Fig. 4 is a medium section corresponding to the line 4—4 of Fig. 3;

Fig. 5 is a side elevation of the motor-assembly, the top cover of the casing having been removed and portions of the lower casing having been broken away;

Fig. 6 is a transverse section on the line 6—6 of Fig. 3;

Fig. 7 is a transverse section on the line 7—7 of Fig. 3;

Fig. 8 is a transverse section on the line 8—8 of Fig. 3;

Fig. 9 is a side elevation of the complete motor-assembly unit removed from the casing;

Fig. 10 is a perspective view of the assembly-plate or frame provided with socket-holes in predetermined arrangement to locate the parts of the motor-assembly as they are mounted on said assembly-plate; and Fig. 11 is a fragmentary vertical section of the casing showing a modified form of a connection between the assembled casing parts and the assembly-plate.

According to the form in which the invention is illustrated in the drawings, the several parts of a power-converting and power-transmitting unit are assembled on an assembly-plate or frame 20 which is to be subsequently mounted in a hand-grip casing with a three-point suspension respectively at a rear hole or socket 21 and at laterally-spaced holes or sockets 22 at the forward end of said assembly-plate, said holes or sockets being symmetrically disposed with respect to the longitudinal axis of the assembly-plate. In the illustrated form of the invention, the power-converting and power-transmitting unit comprises, with the assembly-plate 20, a motor-assembly comprising an armature 23 carried by spindle 24 which, in the present instance, constitutes the power-transmitting spindle of the unit, said spindle being rotatably journaled in bearings 25 and 26 which are respectively secured to the assembly-plate 20 by suitable screws entering the socket-openings 27 and 28 formed in the assembly-plate 20. The armature 23, thus mounted, revolves in a transverse opening 29 in the assembly-plate 20 and as shown in Figs. 3, 4 and 5, has a laminated construction. A field-winding 29a for energizing the motor, is preferably rectangular in form and is disposed in an opening 30 formed at the rear of assembly-plate 20. The energizing-coil 29a is mounted upon the intermediate or coil-core member 31 of a laminated core-structure which includes with the intermediate coil-core 31, laterally-spaced pole-arms 33 which extend forwardly from the coil-core member 31 normally to and past the plane of rotation of the armature 23. As shown in Figs. 4 and 8, the pole-arms 33 are riveted to the assembly-plate 20 by rivets 34, the assembly-frame 20 being provided with holes or sockets 35 for this purpose. Prior to the integration of the laminae composing the core-structure, said laminae have been stamped in L-shaped form and provided with similarly-arranged holes or sockets corresponding to the desired locations of rivets 34 so that when they are subsequently riveted to the assembly-plate or frame, they will be automatically arranged in the desired formation to be hereinafter referred to. This having been done, two groups of the L-shaped laminae are arranged in stacks having a thickness equal to one-half the thickness of the completed core-structure after which the pole-arm portion of each stack is further built up by laminae of shorter length to the full thickness of the core-structure, said shorter laminae having been stamped in different widths for a purpose to be presently explained, and also provided with rivet holes to bring them into conformity with the desired formation referred to. The L-shaped laminae together with the superposed shorter laminae are then secured together by a single rivet to facilitate handling and after the stem-portions 31a and 31b of the core-sections thus built up have been inserted through the energizing-coil 29a from opposite ends thereof, the laminated sections are placed upon the assembly-plate or frame 20 with the several rivet holes in the former in proper registry and in alignment with the socket-holes previously formed in the assembly-plate or frame by the aid of jigs or in any other suitable manner. It will now be understood from the above description, that when the core-sections are riveted in predetermined positions on the assembly-plate or frame 20 they will be arranged in the desired formation. Due to the stamping of the shorter laminae in different widths, the pole-arms 33 are caused to assume a stepped formation about the peripheral path of armature 23 as shown at 36, 37 and 38, in Fig. 8. In this way, the pole-members of the electromagnetic stator are constructed to approximately conform to the surface of revolution defined by the periphery of revolving armature 23 and to secure substantially the same magnetic effects as those produced by core-structures which are shaped by relatively-expensive machining operations performed on the pole-arms after the laminae have been completely assembled. As shown best in Figs. 3 and 5, the coil-supporting spool is provided with end-flanges 41 which carry suitable binding-posts 42 to which opposite terminals of the energizing-coil 29a are secured. Connected to the coil-terminals at binding-posts 42 are two current-supplying conductors 43 which extend through an insulating-bushing 44 arranged at the rear end of assembly-plate 20. Leading forwardly from the energizing-coil 29 are two conductors 45 and 46 which connect said energizing-coil to the terminals of a make-and-break device now to be described. Referring to Figs. 3 and 7, the conductor 45 is connected at its forward end to a binding-post 47 at the fixed end of a transverse spring-arm 48. At the outer end of spring-arm 48 is a movable contact 49 which is movable into and out of engagement with a fixed contact 50, said contact 50 being electrically connected to the horizontal arm 51 of a current-conducting angle member, the vertical arm 52 of said angle member being connected to conductor 46. As shown in Fig. 7, the armature-spindle 24 is provided with a small cam 53 which operates upon a cam-block 54 secured to the under-side of contact-arm 48. Secured to the armature-spindle 24 adjacent to the bearing 26, is a starting-wheel 55 which protrudes somewhat at the top into a depression formed in a re-entrant portion 56 of the top-wall of the hand-grip casing. A transverse slot 57 at the bottom of said depression accommodates the starting-wheel after the hand tool has been completely assembled and the hand-grip casing applied thereto. As shown clearly in Fig. 4, this construction affords ample protection to a user's fingers while grasping the hand-grip casing in his hand while, at the same time, the starting-wheel is rendered readily accessible for a spinning movement imparted thereto by one who grasps the power-tool in one hand.

After all of the several parts of the power-converting and power-transmitting unit have been assembled on the assembly-plate 20 as shown in Fig. 9, and in the manner described above, the entire assembly is placed as a distinct unit in one part 58 of the hand-grip casing. For this purpose, said casing part 58 is provided with a centrally-located boss 59 at its rear end, said boss being provided with a countersunk socket 60 with which the socket-opening 21 in the rear end of the assembly-plate 20 is to be coaxially aligned. In a similar manner, the forward end of assembly-plate 20 is provided with laterally-spaced bosses 61 having their top surfaces disposed in a common plane with the top surface of boss 59 at the rear end of the casing and with countersunk sockets 62 with which the sockets 22 in the forward end of assembly-plate 20, are to be coaxially aligned. After the motor-assembly has been placed in the casing part 58, three tie-members, shown on the drawings in the form of screws 63, are inserted through the sockets 60 and 62 and threaded at their inner ends into the lower ends of three coupling-members shown in the form of elongated nuts 64 which are suitably arranged above the assembly-plate 20 for this purpose, washers 65 being interposed between the lower ends of said nuts and said assembly-plate 20. In Fig. 6, an upper casing-part 66 substantially similar in form to lower casing-part 58 is shown in edgewise abutment at 67 in substantially the medial horizontal plane of the hand-grip casing. At its rear end, said casing part 66 is provided with a countersunk socket 68 and at its forward end with laterally-spaced countersunk sockets 69 which extend respectively through bosses 70 and 71, said socket-openings being suitably arranged to be brought into coaxial alignment with the socket-openings 60 and 62 in the lower casing-part 58. Mounted in the countersunk sockets 68 and 69, are three tie-members in the form of screws 72 which have their lower ends threaded into the upper ends of elongated nuts 64 respectively. It will be readily understood from the foregoing description that the previously-located sockets in the assembly-plate or frame 20, lower casing-part 58, and upper casing-part 66, will automatically effect an accurate registration of the sockets 21, 60 and 68 at the rear end of the casing and the laterally-spaced sockets 22, 62 and 69, at the forward end of the casing, when the tie-members or screws 72 or 80 are inserted thereinto.

A modified form of the device for connecting the hand-grip casing-parts together in accurately predetermined arrangement each with the other and in predetermined relation to the assembly-plate and motor-assembly mounted thereon, is shown in Fig. 11. According to Fig. 11, the hand-grip casing comprises a lower part 73 provided with a boss 74 of somewhat greater axial extent than that shown in the corresponding casing-part described above, said boss 74 being provided with a countersunk socket 75 for the reception of a tie-member in the form of a screw 76 which is threaded at its inner end into the rear end of an assembly-plate 77. At its forward end said casing-part 73 is provided with laterally-spaced bosses (not shown) similar in form to boss 74, all of said bosses having their upwardly-presented surfaces disposed in a common plane for the assembly-plate 77 to rest thereon. An upper casing-part 78 is provided with a countersunk socket 79 for the reception of an elongated tie-member in the form of a screw-bolt 80 which is threaded at its lower end into the rear end of assembly-plate 77 in juxtaposition to the screw 76 in the medial vertical plane of the casing. At its forward end, the upper casing-part 78 is secured to the assembly-plate 77 in laterally-spaced planes including laterally-spaced tie-members or screws similar to the screws 76 and 80 at its rear end so that each of the casing-parts 73 and 78 is connected to the assembly-plate 77 by three sets of screws or tie-members arranged in three parallel vertical longitudinal planes of the hand-grip casing. In effect, therefore, the upper casing-part 78 is connected to the assembly-plate 77 at three points separate and distinct from the three-point suspension-connection between the lower part 73 of the casing and said assembly-plate but in accurate registry therewith. This construction renders it unnecessary to employ the coupling-members or elongated nuts and at the same time permits the upper casing-part to be removed for inspecting and repairing the motor-assembly without disturbing the three-point suspension-connection between the lower casing-part and the assembly-plate 20. As shown in Figs. 3, 4 and 5, casing-parts 58 and 68 have rear end-portions 58a and 68a which fit together to form a vestibule or housing for the insulating-bushing 44 which house the conductors 43 leading to the energizing-coil 29a. According to the drawings, the invention has been illustrated in an adaptation to a dry shaver. For this purpose, the armature-spindle 24 is extended through an opening 82 in a transverse partition wall 83 at the forward end of the hand-grip casing, the forward end of the armature-spindle 24 being thereby disposed in a transverse groove 84 for actuating the reciprocatory parts of the dry shaver (not shown). For this purpose, the armature-spindle 24 may be provided with an eccentric pin-drive or other suitable device for actuating said reciprocatory parts.

From the foregoing specification, the advantageous features of the present invention in its adaptation to a hand tool including motivating parts rotating at high velocity, will be understood. As shown in Fig. 8, the motor-assembly comprises a laminated electromagnetic stator having an axis of symmetry extending longitudinally of the hand tool; a rotary system having its axis of rotation, which is also an axis of symmetry, coincident with the axis of symmetry of the stator; an assembly-frame which positively maintains the stator and rotary system in coordinated relation one with the other with respect to their common axis of symmetry; a hand-grip casing having a longitudinal axis of symmetry substantially coincident with the common axis of symmetry of the stator and rotary system; and a three-point suspension between the hand-grip casing and the assembly-frame which is symmetrically disposed with respect to a plane including the axis of symmetry and therefore provides a better-balanced support for the operating parts.

As will be readily understood, a considerable saving in time and labor costs can be effected by assembling the parts of the laminated electromagnetic stator with the rotor on an assembly-frame whereon said parts are located in cooperative relation each to the others by means of socket-openings which have been previously located by means of a prior operation performed thereon. A further economy in manufacturing costs resides in stamping the core-forming laminae having pole-arm portions of different widths in such a way that during the assembling operation, said pole-arm portions become arranged in stepped formation about the peripheral path of the armature and thereby render it unnecessary to resort to a relatively-expensive machining operation performed on the completely-assembled pole-arms. It is readily seen that the complete organization of the power-converting and power-transmitting unit independently of and before it is placed in the hand-grip casing, saves time, labor and effort by rendering the places where the several parts are to be located on the assembly-frame accessible from all sides. It will be seen, furthermore, that the complete assembly of the parts of the operating structure on an assembly-frame prior to its placement in the hand-grip casing and the subsequent arrangement of the assembly-frame in said casing by means of a three-point suspension symmetrically disposed with respect to a plane including the common axis of symmetry of the several parts, will impart an improved balance to the hand-tool and tend to reduce to a minimum the vibrations of said hand tool. Another advantageous feature of the invention resides in the fact that either part of the hand-grip casing or both parts can be removed from the operating structure for the purpose of inspection, repair, or replacement, without in any way interfering with the set-up of the apparatus.

The invention may be carried out in other specific ways than those herein set forth, without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. In a power-driven hand tool, the combination with a power-converting-and-transmitting unit, comprising an assembly-plate and a motor-assembly mounted on said assembly-plate; of a hand-grip casing comprising a plurality of separable parts constructed to be assembled about the said power-converting-and-transmitting unit; and means for connecting the said casing parts to the said assembly-plate to retain the said casing parts in registry, each with respect to the other and in predetermined relation to the said power-converting-and-transmitting unit.

2. In a power-driven hand tool, the combination with a power-converting-and-transmitting unit, comprising an assembly-plate and a motor-assembly including a motor mounted on said assembly-plate; of a hand-grip casing comprising a plurality of separable parts constructed to be assembled about the said power-converting-and-transmitting unit, one of said casing parts being provided with bearing-lugs having their bearing-surfaces arranged in a common plane to supportably engage said assembly-plate; and means interengaging between said assembly-plate and each of said casing parts for retaining the said casing parts in registry with each other and to secure the power-converting-and-transmitting unit in predetermined arrangement within said casing, the said casing parts being constructed to form a casing having an axis of symmetry substantially coincident with the axis of said rotor.

3. In an electric rotary tool, in combination with a rotary armature, an electromagnetic stator comprising laterally-spaced pole-arms arranged on diametrically-opposite sides of and extending past the plane of rotation of said armature and an intermediate coil-core extending transversely between said pole-arms; and an energizing-coil mounted on the intermediate coil-core, the said pole-arms being constructed of stamped sheet-metal laminae provided with square edges and arranged in circumferentially-stepped formation about the periphery of said armature.

4. In an electric rotary hand-tool, the combination with an assembly-plate; of an electric motor having a rotary armature rotatably mounted on said assembly-plate; a laminated electromagnetic stator comprising an intermediate coil-core arranged substantially parallel to the plane of rotation of said armature and pole-arms projecting from opposite ends of said coil-core into juxtaposition to the periphery of said armature, said pole-arms being composed of laminae stamped from sheet-metal in variant widths and arranged on the said assembly-plate in stepped formation about the periphery of said armature; and an energizing-coil mounted on the coil-core of said magnet.

5. In a power-driven hand-tool, the combination with an assembly-plate; of an electric motor comprising an armature rotatable about an axis extending longitudinally of the hand-tool; a laminated electromagnetic stator having an intermediate coil-core arranged substantially parallel to the plane of rotation of said armature and pole-arms projecting from said coil-core in symmetrical arrangement with said axis and into juxtaposition to said armature, said pole-arms comprising laminae arranged endwise to and in stepped formation about the periphery of said armature; an energizing-coil mounted on the coil-core; a two-part hand-grip casing for the aforesaid parts, one of said casing-parts being provided with three symmetrically-disposed supporting-bosses for the assembly-plate, said bosses having their upwardly-presented surfaces arranged in a common plane; means for securing said assembly-plate to said bosses in predetermined relation to said casing-parts; and means for securing the other casing-part to said assembly-plate in predetermined relation to the first-mentioned casing-part.

6. In an electric rotary hand-tool, the combination with a hand-grip casing comprising two parts provided with side-walls in edgewise abutment in a common medial horizontal plane of said casing; one of said casing-parts being provided with supporting-bosses having their upwardly-presented surfaces arranged in a common plane spaced from the medial horizontal plane of said casing; an assembly-plate; a power-transmitting spindle rotatable on said assembly-plate about an axis extending longitudinally thereof; an armature mounted on said spindle to rotate substantially in a plane transverse to said assembly-plate; a laminated electromagnetic stator comprising pole-arms extending longitudinally of the assembly-plate into juxtaposition to the periphery of said armature and a coil-core extending transversely between said pole-arms; said pole-arms being composed of laminae disposed flatwise on said assembly-plate and edgewise to said armature, said laminae being arranged in stepped formation about the periphery of said armature; and a field-winding mounted on said coil-core, said assembly-plate being mountable upon the bosses in said casing-part with the axis of said rotary spindle arranged in the medial horizontal plane of said casing.

7. In a power-driven hand-tool, the combination with an assembly-plate; of an electric motor-assembly mounted on said assembly-plate; a two-part hand-grip casing for said assembly-plate and electric motor-assembly, said assembly-plate and casing-parts being provided with socket-openings arranged to be coaxially aligned in the assembled position of these parts; and tie-members extending through the socket-openings in the casing-parts and said assembly-plate for holding the casing-parts in assembled relation.

8. In a power-driven hand-tool, the combination with an assembly-plate; of an electric motor-assembly permanently mounted on said assembly-plate; casing-members constructed to fit together about said assembly-plate and enclosing said motor-assembly, said assembly-plate and casing-members being provided with a plurality of sets of coaxially-aligned socket-openings; coupling-members arranged in coaxial alignment with the aligned socket-openings in said assembly-plate and one of said casing-members; tie-members interengaging between the coupling-members and the said one of said casing-members to retain them in assembled relation each to the other, and other tie-members interengaging between said coupling-members and the other casing-member to retain said other casing-member in position on the said one of the casing-members.

9. In a power-driven hand-tool, the combination with an assembly-plate; of an electric motor-assembly mounted on said assembly-plate and constituting therewith a power-converting-and-power-transmitting unit; complementary hand-grip casing-members constructed to interfit each with the other for substantially enclosing the power-converting-and-power-transmitting unit therewith; a three-point suspension-connection between one of said casing-members and said assembly-plate; and means for connecting the other casing-member to said assembly-plate in registered relation to the said one of said casing-members connected to the assembly-plate by the three-point suspension-connection.

10. In a power-driven hand-tool, the combination with an assembly-plate; of an electric motor-assembly mounted as a unit on said assembly-plate; complementary hand-grip casing-members constructed to fit together in registry each with the other about said motor-assembly unit; a three-point suspension-connection between said assembly-plate and one of said casing-members for retaining the former in predetermined fixed relation to the latter; and another three-point suspension-connection separate and distinct from the first-mentioned three-point suspension-connection for independently connecting the other casing-member to said assembly-plate.

11. In a power-driven hand-tool, the combination with an assembly-plate having a longitudinal plane of symmetry; of a motor-assembly mounted as a unit on said assembly-plate and symmetrically disposed with respect to said longitudinal plane of symmetry of the assembly-plate; and a hand-grip casing for said assembly-plate and motor-assembly, said casing comprising separably-connected parts one of which, at least, is connected to said assembly-plate.

12. In a power-driven rotary hand-tool, the combination with an assembly-plate having a longitudinal plane of symmetry; of a motor-assembly permanently mounted on said assembly-plate and including a rotary armature and a field-winding therefor, said armature and field-winding having a common axis of symmetry disposed in the longitudinal plane of symmetry of said assembly-plate; a casing comprising complementary parts constructed to be separably assembled in registered relation each to the other; means for mounting said assembly-plate within and securing it to one of said casing parts; and means for connecting the other casing part to said assembly-plate.

13. In an electric rotary hand-tool, the combination with an assembly-plate having a plane of symmetry; of an armature rotatably mounted on said assembly-plate and having its rotational axis arranged parallel to said assembly-plate and in the plane of symmetry thereof; a field-magnet for said armature, said field-magnet being mounted on said assembly-plate and having an axis of symmetry coincident with the rotational axis of said armature; a hand-grip casing comprising parts constructed to be separably assembled and having an axis of symmetry coinciding with said rotational axis of the armature; means for mounting said assembly-plate within and securing it to one of said casing parts; and means for connecting the other casing part to said assembly-plate.

14. In an electric rotary hand-tool, the combination with an electromagnetic rotor, of an electromagnetic stator, said rotor and stator having a common axis of symmetry substantially coincident with the rotary axis of the former; an assembly-plate disposed substantially parallel to said axis of symmetry; a hand-grip casing having an axis of symmetry substantially coincident with said common axis of symmetry; and means for securing said assembly-plate within said casing with a three-point suspension in a plane parallel to said axis of symmetry.

15. In a power-driven hand-tool, the combination with an assembly-plate; of a motor-assembly mounted on the said assembly-plate; a hand-grip casing for said assembly-plate and motor-assembly, said hand-grip casing comprising two component parts provided with interfitting marginal edges; and stress-resisting tie-members connecting the said component parts of the hand-grip casing to the said assembly-plate, the said tie-members being constructed and arranged to position the hand-grip casing parts in register, each with respect to the other, and to arrange the said assembly-plate and motor-assembly in predetermined arrangement with respect to the hand-grip casing comprising the said component parts.

JAMES R. PUTNAM.